(12) United States Patent
Gu et al.

(10) Patent No.: US 10,942,816 B1
(45) Date of Patent: Mar. 9, 2021

(54) SYSTEMS AND METHODS FOR DYNAMICALLY ADJUSTING A BACKUP POLICY

(71) Applicant: Symantec Corporation, Mountain View, CA (US)

(72) Inventors: Lei Gu, Bedford, MA (US); Ilya Sokolov, Boston, MA (US)

(73) Assignee: NortonLifeLock Inc., Tempe, AZ (US)

( * ) Notice: Subject to any disclaimer, the term of this patent is extended or adjusted under 35 U.S.C. 154(b) by 211 days.

(21) Appl. No.: 16/123,390

(22) Filed: Sep. 6, 2018

(51) Int. Cl.
*G06F 11/14* (2006.01)

(52) U.S. Cl.
CPC ................ *G06F 11/1458* (2013.01)

(58) Field of Classification Search
CPC .................................................. G06F 11/1458
USPC ...................................................... 707/654
See application file for complete search history.

(56) References Cited

U.S. PATENT DOCUMENTS

| | | | | |
|---|---|---|---|---|
| 5,659,614 A * | 8/1997 | Bailey, III | ........ | G06F 11/1451 713/165 |
| 7,509,468 B1 * | 3/2009 | Dalal | ................ | G06F 11/1458 711/152 |
| 8,117,492 B1 * | 2/2012 | Searls | ................ | G06F 11/1458 707/654 |
| 8,626,714 B1 * | 1/2014 | Gibson | .............. | G06F 11/1451 707/640 |
| 8,762,341 B1 * | 6/2014 | Mahajan | ............ | G06F 11/1448 707/640 |
| 8,924,352 B1 * | 12/2014 | Andruss | ............ | G06F 11/1461 707/640 |
| 8,959,056 B1 * | 2/2015 | Weisgerber | ............ | H04L 67/06 707/653 |
| 8,959,058 B1 * | 2/2015 | Kleinschnitz | ....... | G06F 11/3409 707/670 |
| 9,274,897 B2 * | 3/2016 | Clifford | ............. | G06F 11/1461 |
| 9,275,060 B1 * | 3/2016 | Supekar | ............. | G06F 11/1451 |
| 9,292,387 B2 * | 3/2016 | Itasaki | ............... | G06F 11/1458 |
| 9,477,670 B2 * | 10/2016 | Bhasin | .................. | G06F 16/10 |
| 9,858,504 B2 * | 1/2018 | Hibino | .................. | G06F 16/54 |
| 10,140,187 B1 * | 11/2018 | Chan | .................. | G06F 11/3062 |
| 10,185,628 B1 * | 1/2019 | Snyder | ................ | H04N 7/181 |
| 10,387,487 B1 * | 8/2019 | Svendsen | ............ | G06F 16/9535 |
| 10,621,048 B1 * | 4/2020 | Mudgal | .............. | G06F 11/1464 |
| 10,742,665 B2 * | 8/2020 | Gu | ........................ | G06F 3/065 |
| 10,810,088 B1 * | 10/2020 | Gu | ........................ | G06F 11/1461 |
| 10,810,089 B1 * | 10/2020 | Gu | ........................ | G06F 11/1461 |
| 2002/0031178 A1 * | 3/2002 | Isozaki | ............... | H04N 19/177 375/240.12 |
| 2007/0088674 A1 * | 4/2007 | Kawate | ................ | G11B 27/034 |
| 2007/0136541 A1 * | 6/2007 | Herz | ................... | G06F 11/1466 711/162 |

(Continued)

*Primary Examiner* — Phuong Thao Cao (74) *Attorney, Agent, or Firm* — FisherBroyles, LLP (57) ABSTRACT

The disclosed computer-implemented method for dynamically adjusting a backup policy may include dynamically adjusting a backup policy may include accessing a media file, evaluating an objective criterion of a difficulty to reproduce the media file to generate a difficulty rating, comparing the difficulty rating of the media file to an existing difficulty rating for at least one previous media file, and adjusting a backup policy for the media file based on the comparison of the difficulty rating. Various other methods, systems, and computer-readable media are also disclosed.

20 Claims, 7 Drawing Sheets

(56) References Cited

U.S. PATENT DOCUMENTS

| | | | |
|---|---|---|---|
| 2007/0291607 A1* | 12/2007 | Katata | H04N 9/8042 369/53.15 |
| 2008/0016127 A1* | 1/2008 | Field | G06F 11/1458 |
| 2009/0327305 A1* | 12/2009 | Roberts | G06F 3/0649 |
| 2011/0129126 A1* | 6/2011 | Begeja | G06F 16/784 382/118 |
| 2012/0148165 A1* | 6/2012 | Yabu | G06K 9/6224 382/225 |
| 2012/0191658 A1* | 7/2012 | Ambat | G06F 21/6209 707/654 |
| 2013/0191458 A1* | 7/2013 | Krishnan | G06Q 10/10 709/204 |
| 2013/0332068 A1* | 12/2013 | Kesar | H04W 4/029 701/430 |
| 2013/0347047 A1* | 12/2013 | Tanaka | H04N 21/8456 725/110 |
| 2014/0019418 A1* | 1/2014 | Chu | G06F 11/1461 707/654 |
| 2014/0052694 A1* | 2/2014 | Dasari | G06F 16/23 707/654 |
| 2014/0063314 A1* | 3/2014 | Sankaranarayanan | H04N 5/247 348/333.02 |
| 2014/0081920 A1* | 3/2014 | Itasaki | G06F 16/178 707/654 |
| 2014/0254945 A1* | 9/2014 | Hibino | G06K 9/00671 382/218 |
| 2014/0307974 A1* | 10/2014 | Tanaka | G06K 9/72 382/218 |
| 2015/0169645 A1* | 6/2015 | Li | G06F 16/532 707/722 |
| 2015/0262037 A1* | 9/2015 | Li | G06K 9/6296 382/159 |
| 2015/0363635 A1* | 12/2015 | Suri | G06K 9/00221 386/241 |
| 2016/0086342 A1* | 3/2016 | Yamaji | G06T 7/246 382/103 |
| 2016/0179631 A1* | 6/2016 | Sun | G06F 11/1471 707/648 |
| 2017/0223031 A1* | 8/2017 | Gu | H04L 63/1416 |
| 2018/0060180 A1* | 3/2018 | Tan | G06F 11/1464 |
| 2018/0121828 A1* | 5/2018 | Keysers | G06N 20/00 |
| 2018/0332140 A1* | 11/2018 | Bullock | G06F 16/337 |
| 2019/0108097 A1* | 4/2019 | Zhuang | H04L 63/08 |
| 2019/0179712 A1* | 6/2019 | Snyder | H04N 7/188 |

\* cited by examiner

SYSTEMS AND METHODS FOR DYNAMICALLY ADJUSTING A BACKUP POLICY

BACKGROUND

Computing devices commonly back up data to protect against unforeseen data loss. Data loss may occur through hardware failure, software failure, accidently deletion, or malicious software access among other possibilities. Once data is lost, it may be gone forever, or be extremely expensive to recover.

There is a common misconception that storage is cheap or even free, and that therefore it is convenient to simply continuously backup everything. However, this is often not true, particularly for users of mobile devices. Backing up data requires not only storage space for saving the data, but bandwidth to transfer the data to the backup location. On a local network, the bandwidth costs are negligible but backing up over other networks, such as a mobile network, may be prohibitively expensive. Therefore, a backup policy for data stored on a device connected to a local network may differ from data stored on a device connected to a mobile network. The instant disclosure, therefore, identifies and addresses a need for systems and methods for dynamically adjusting a backup policy.

SUMMARY

As will be described in greater detail below, the instant disclosure describes various systems and methods for dynamically adjusting a backup policy.

In one example, a method for dynamically adjusting a backup policy may include accessing a media file, evaluating an objective criterion of a difficulty to reproduce the media file to generate a difficulty rating, comparing the difficulty rating of the media file to an existing difficulty rating for at least one previous media file, and adjusting a backup policy for the media file based on the comparison of the difficulty rating.

In another example, the media file may be at least one of a digital image or a digital video.

In another example, evaluating an objective criterion may include comparing a distance between a user's primary location and a location at which the media file was produced.

In some examples, the method may further include determining the location at which the media file was produced. In some examples, determining the location may include at least one of accessing metadata in the media file, performing optical recognition of landmarks in the media file, performing optical recognition of landmarks in at least one previous media file, performing optical character recognition of text in the media file, or performing optical character recognition of text in at least one previous media file.

In another example evaluating an objective criterion may include identifying subjects in the media file.

In another example, evaluating an objective criterion may further include determining a frequency that the subjects appear together in the at least one previous media file.

In another example, evaluating an objective criterion may further include determining a frequency that the subject appears in the at least one previous media file.

In some examples, determining an objective criterion may further include determining an event occurring in the media file. In another example, determining an event may include accessing user data. In some examples, user data may include at least one of social media information, a user calendar, user email, user messages, or user internet history.

In another example, evaluating an objective criterion may further include determining a quantity of existing media files similar to the media file.

In another example, evaluating an objective criterion may include comparing a quality of the media file to a quality of each of the existing media files similar to the media file.

In one embodiment, a system for dynamically adjusting a backup policy may include at least one physical processor and physical memory that includes computer-executable instructions that, when executed by the physical processor, cause the physical processor to access a media file, evaluate an objective criterion of a difficulty to reproduce the media file to generate a difficulty rating, compare the difficulty rating of the media file to an existing difficulty rating for at least one previous media file, and adjust a backup policy for the media file based on the comparison of the difficulty rating.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to access a media file, evaluate an objective criterion of a difficulty to reproduce the media file to generate a difficulty rating, compare the difficulty rating of the media file to an existing difficulty rating for at least one previous media file, and adjust a backup policy for the media file based on the comparison of the difficulty rating.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for dynamically adjusting a backup policy. As will be explained in greater detail below, by dynamically adjusting a backup policy for media file, the systems and methods described herein may be able to reduce costs associated with backing up media files while protecting against the potential loss of a media file. By dynamically adjusting the backup policy of media files based on a difficulty to reproduce the media file, the systems and methods described herein may prioritize the backup of hard to reproduce media files while reducing the backup of media files that may be easily replaced, thereby reducing the total amount of data transferred over a network and the required storage.

In addition, the systems and methods described herein may improve the functioning of a computing device by reducing the amount of data transfer necessary to back up media files of the computing device. The systems and methods may further improve the performance of a low bandwidth network by reducing the amount of data transferred while maintaining a backup of the media files of the computing device.

Figure 1:
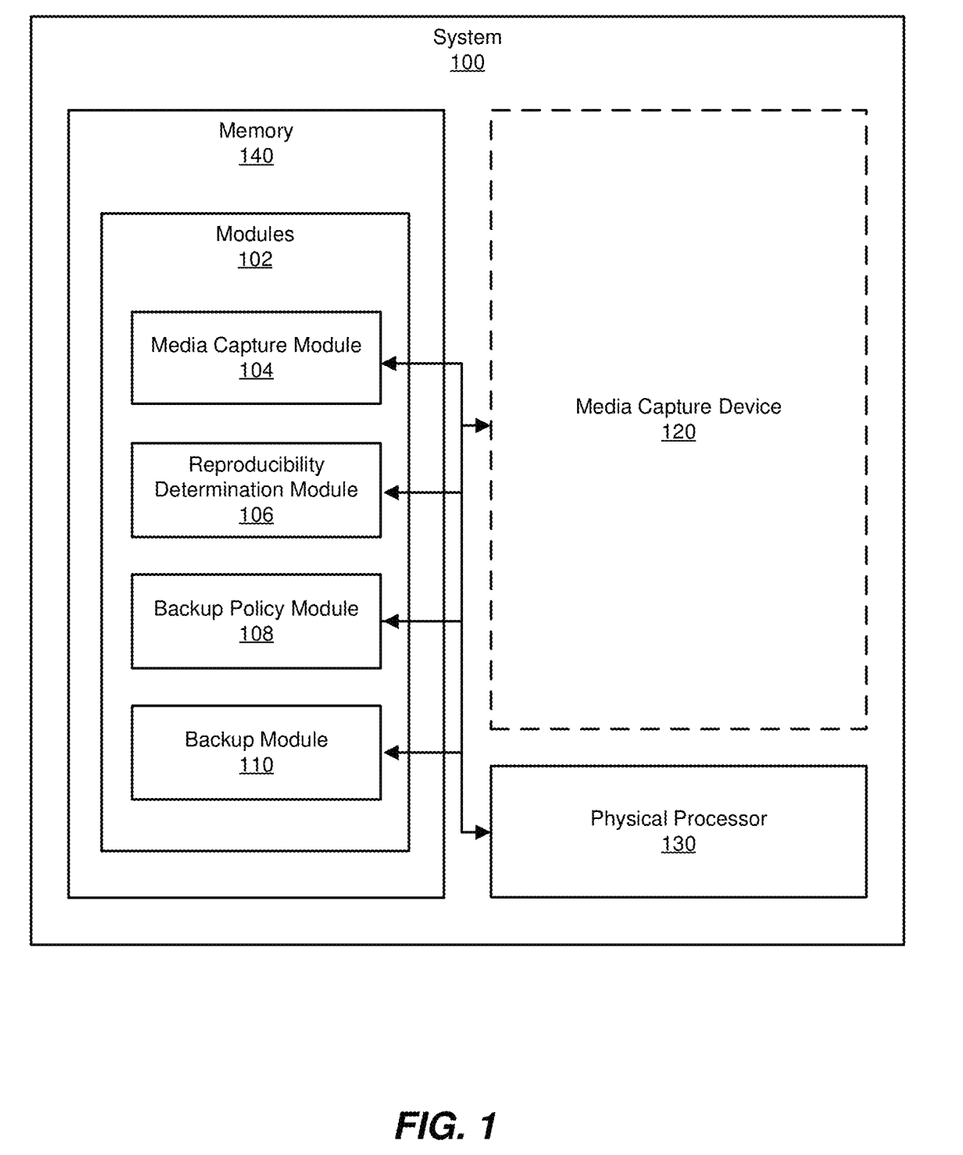
FIG. 1 is a block diagram of an example system for dynamically adjusting a backup policy.
Figure 2:
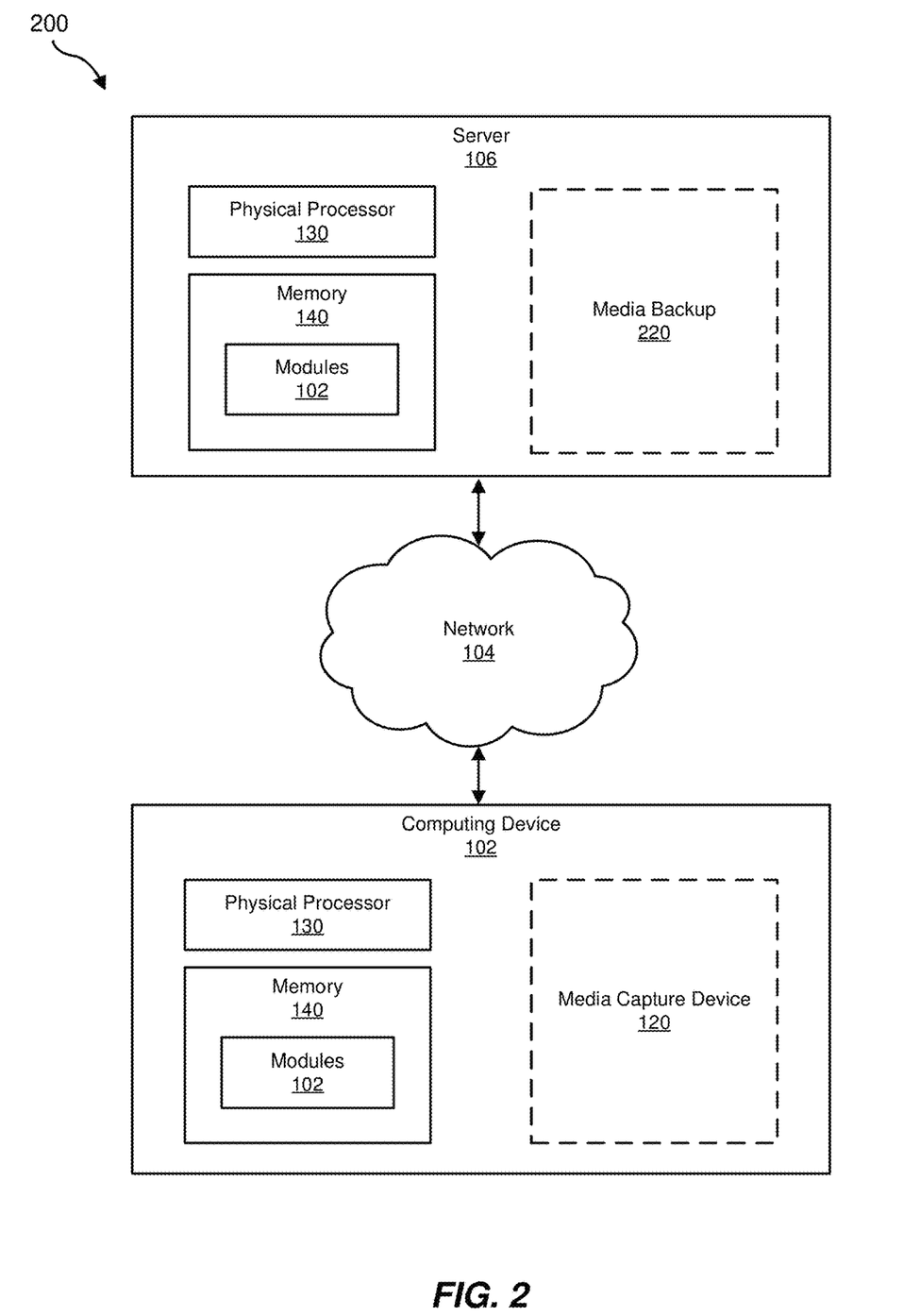
FIG. 2 is a block diagram of an additional example system for dynamically adjusting a backup policy.

The following will provide, with reference to FIGS. 1-2, detailed descriptions of example systems for dynamically adjusting a backup policy. Detailed descriptions of corresponding computer-implemented methods will also be provided in connection with FIG. 3. Detailed descriptions of a user's media gallery will be provided in connection to FIG. 4, while FIG. 5 will provide a detailed description of a media document and its associated meta data. In addition, detailed descriptions of an example computing system and network architecture capable of implementing one or more of the embodiments described herein will be provided in connection with FIGS. 6 and 7, respectively.

FIG. 1 is a block diagram of an example system 100 for dynamically adjusting a backup policy. As illustrated in this figure, example system 100 may include one or more modules 102 for performing one or more tasks. As will be explained in greater detail below, modules 102 may include a media capture module 104, a reproducibility determination module 106, a backup policy module 108, and a backup module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate dynamically adjusting a backup policy. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more media capture devices, such as media capture device 120. Media capture device 120 generally represents any type or form of a device operable to capture media including, but not limited to, video, pictures, text, and audio. In one example, media capture device 120 may include a camera and microphone. Examples of media capture devices 120 include, without limitation, a smartphone camera, a computer camera, a video capture device, a microphone, a scanner, and an interface for interaction with an external media capture device.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to dynamically adjust a backup policy. For example, and as will be described in greater detail below, one or more of modules 102 may cause computing device 202 and/or server 206 to recite steps of method claim using FIG. 2

Computing device 202 generally represents any type or form of computing device capable of reading computer-executable instructions. In some examples, computing device 202 may be a mobile phone. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of providing services for computing device 202 including backup services. In some examples, server 206 is a remote storage device providing a media backup 220. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
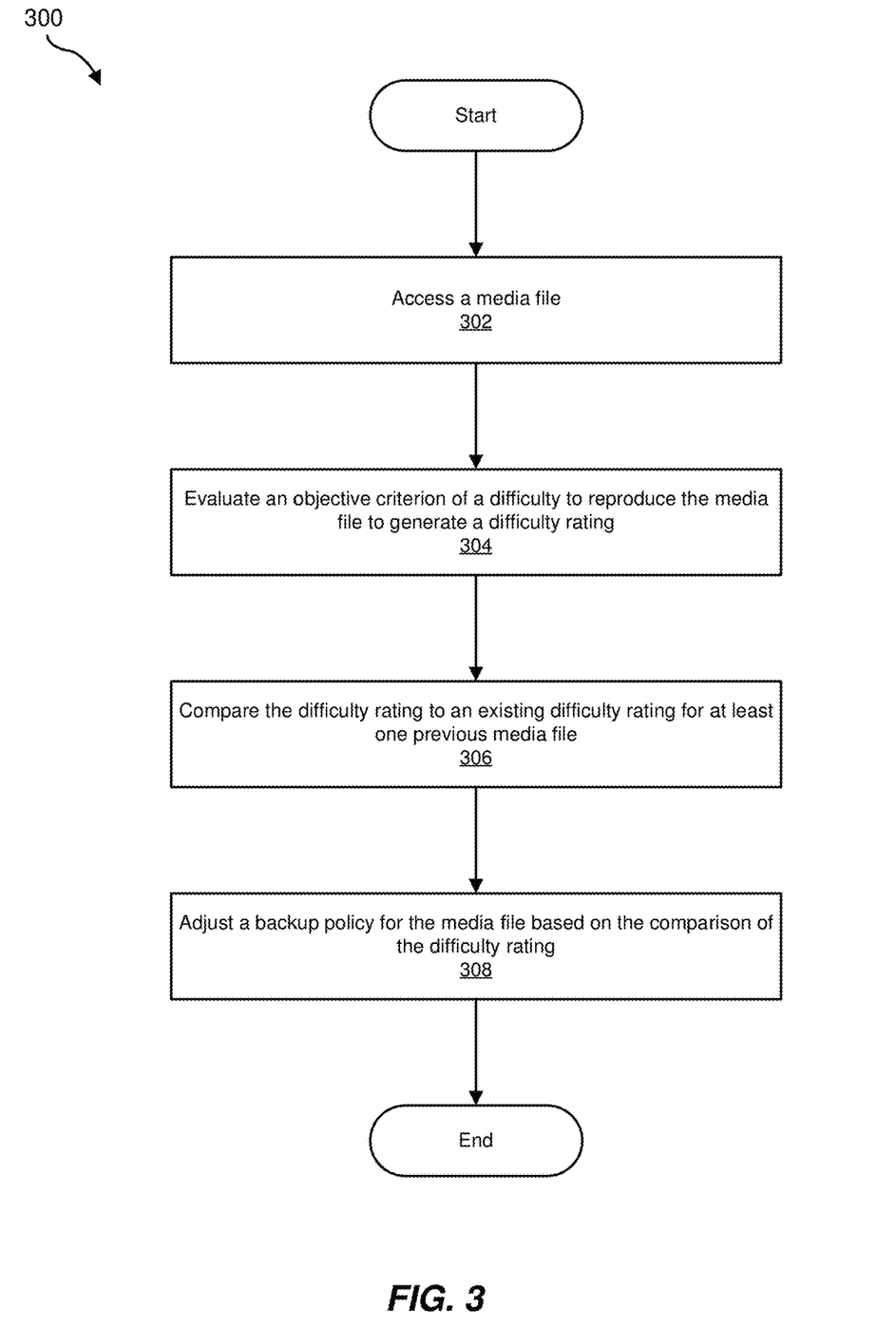
FIG. 3 is a flow diagram of an example method for dynamically adjusting a backup policy.

FIG. 3 is a flow diagram of an example computer-implemented method 300 for dynamically adjusting a backup policy. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

Figure 4:
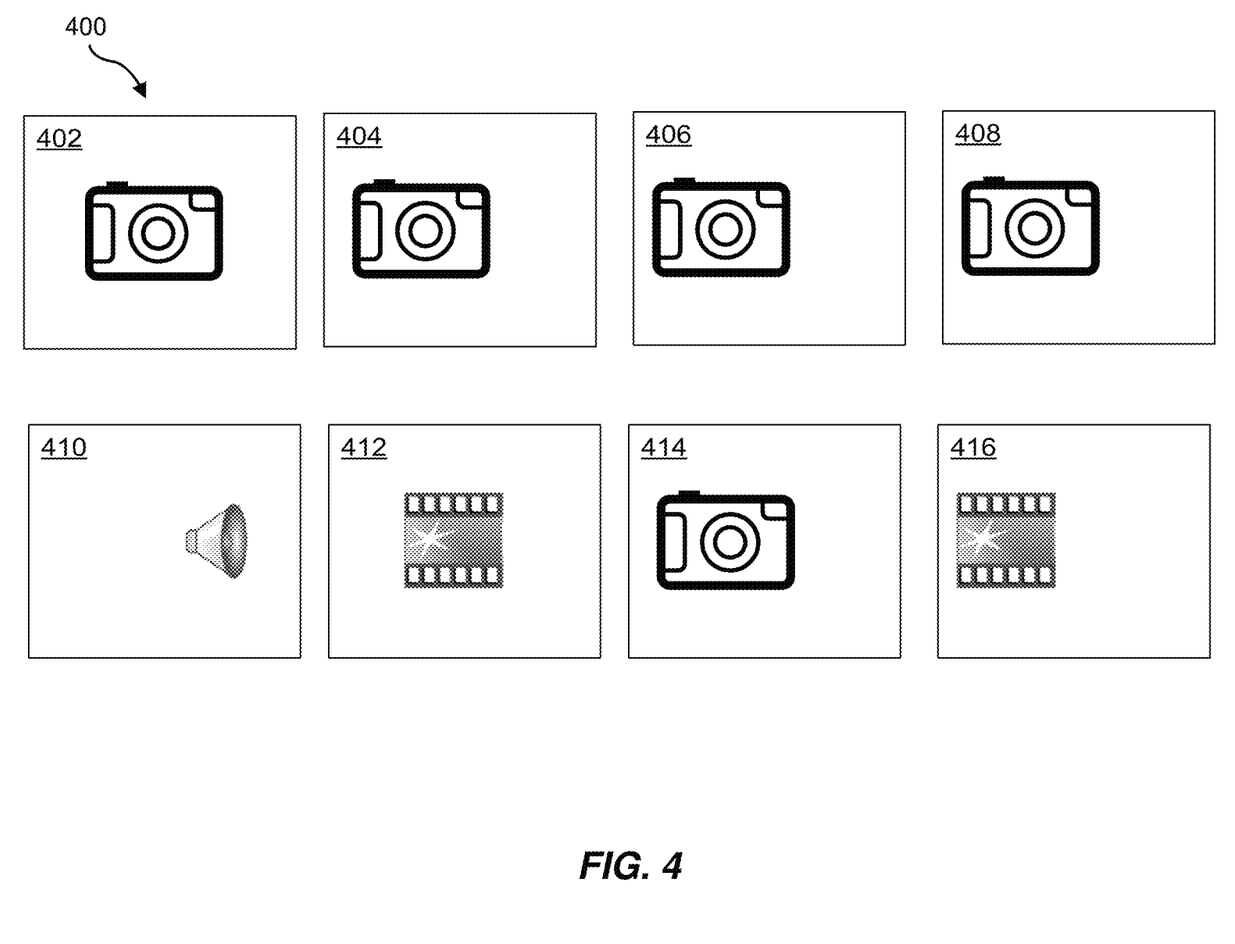
FIG. 4 is a generic diagram of a user's media gallery.

FIG. 4 is a schematic overview of a user's media gallery 400. Media gallery 400 is illustrated as a media gallery as presented to a user, but one or ordinary skill in the art will recognize that the description is applicable to any data format storing a user's media data. For example, the described media and accompanying relationships are applicable to a media database, a media file structure, or a social media gallery. Media gallery 400 may include a plurality of media files such as photographs 402-408, sound recordings 410, videos 412, shared photograph 414, and shared videos 416.

Figure 5:
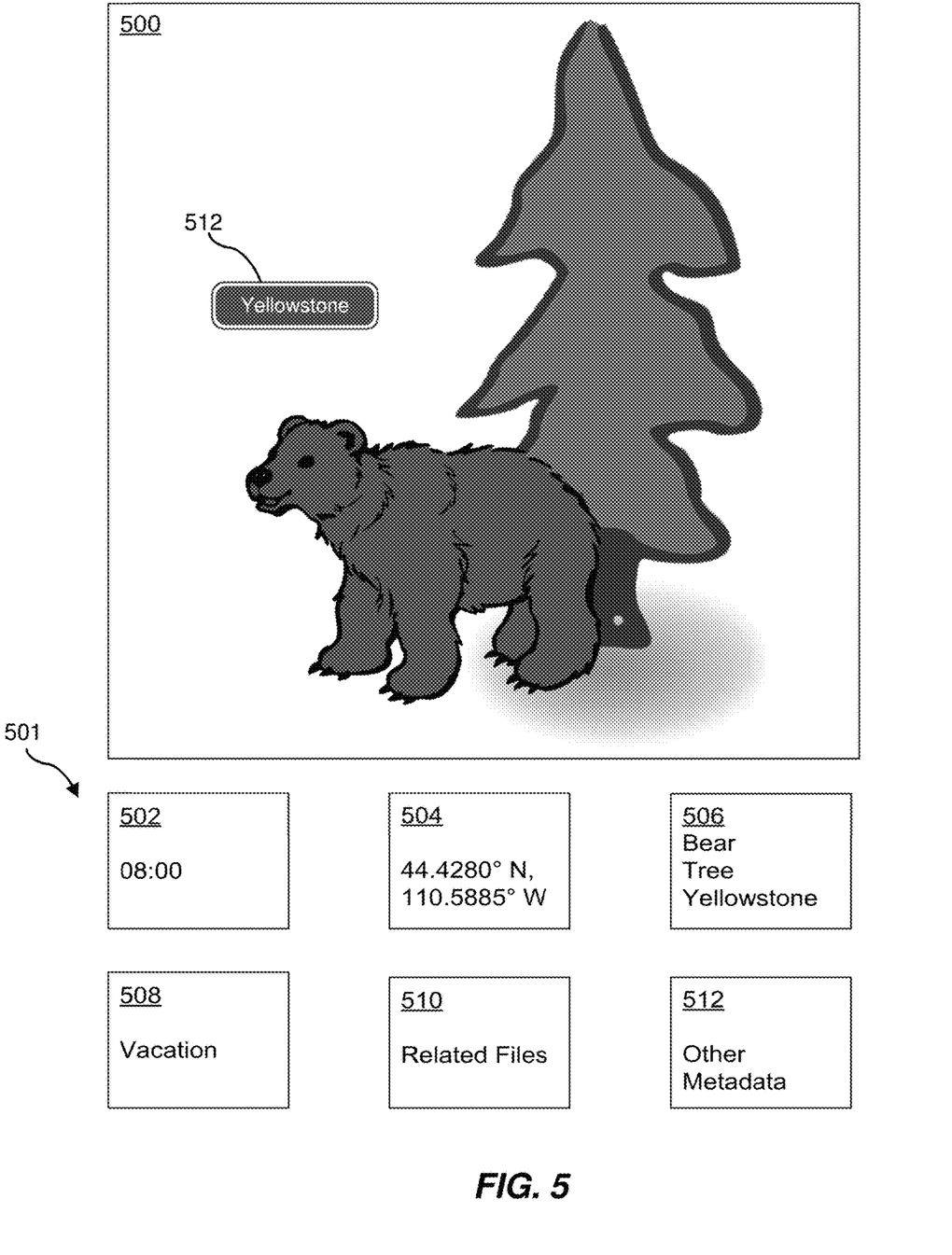
FIG. 5 is a generic diagram of a media file metadata.

Each media file may have accompanying metadata 501, as shown in FIG. 5. For example, media file 500 may have accompanying metadata 501 including an associated time 502, an associated location 504, a subject 506, a tag 508, related file identifier 510, or other metadata 512. Metadata 501 may be generated at the time the file is created, or it may be added or edited at a later time. For example, associated time 502 and location 504 may be applied to a media file at the time the media file is generated, while subject 506, tag 508, related files 510, and other metadata 510 may be applied at a later time.

Method 300 will be described in reference to FIG. 1 through FIG. 5. As illustrated in FIG. 3, at step 302 one or more of the systems described herein may access a media file. For example, media capture module 104 may, as part of computing device 202 in FIG. 2, may access a media file such as media file 500.

The term "media file," as used herein, generally refers to a digital media file storing information representing media. Examples of media files include, without limitation, video files, image files, and sound files.

The systems described herein may perform step 302 in a variety of ways. In one example, computing device 202 may cause media capture device 120 to capture media file 500 that is accessed by computing device 200. For example, a user operating computer device 202 may take a picture using media capture device 120, which may then be stored in memory of computing device 202. In another example, computing device 202 may access an existing media file present in memory of computing device 202. For example, computing device 202 may have previously captured media file 500, or a second computing device 202 may have previously captured media file 500 and transferred media file 500 to computing device 202.

At step 304 one of more of the systems described herein may evaluate an objective criterion of a difficulty to reproduce the media file to generate a difficulty rating. For example, reproducibility determination module 106, as part of computing device 202 in FIG. 2, may evaluate an objective criterion to reproduce media file 500.

The phrase "objective criteria of a difficulty to reproduce," as used herein, generally refers to a standard by which a measurable characteristic of a media may be evaluated to obtain a reproducible result representative of a difficulty to reproduce a media file. For example, an objective criteria may account for characteristics of a media file such as file size, location, date, an importance of a subject, similarity to other media files, or other measurable characteristic. The objective criteria may take into account each of measurable characteristics to produce a difficulty rating representing how difficult it would be to reproduce the media file relative to other media files.

In some examples, the characteristic includes location 504 at which media file 500 is produced. The evaluation of the objective criteria may include a comparison of a distance between location 504 and a user's primary location. For example, a user may have a primary location at a geographic area such as Florida. A user's primary location may be determined by way of user history or a user may manually input a primary location. Location may be determined through location metadata 504, such a global positioning coordinates associated with media file 504. In other examples, media file 504 may be analyzed to determine cues as to the location where media file 500 was produced. For example, an image may be analyzed to recognize text, such as a sign 512, to determine a location. In the example of FIG. 5, computing device 202 may perform optical character recognition to recognize that sign 512 reads "Yellowstone." Or in another example, media file 500 may be compared to known landmarks to determine the location. For example, if media file 500 included an image of "Old Faithful," computing device 202 may recognize the landmark and determine that the image is taken in Yellowstone National Park. A distance between where media file 500 was produced and the user's primary location may then be used as a characteristic for evaluating the objective criteria to determine the difficultly to reproduce the media file. For example, an objective criteria may score the distance between the primary location and the media file production location as a linearly increasing function, such that greater distances result in a greater difficulty to reproduce rating.

In another example, the characteristic may be an identity of a subject within media file 500. The evaluation of the objective criteria may be dependent on an identity of the subject within media file 500. For example, if subject is uncommon it may be more difficult to reproduce than a common subject. In the example of FIG. 5, subject metadata 506 indicates that the subject of the media file 500 is bear and tree. Bear may result in a greater difficulty to reproduce rating since a bear may be an uncommon occurrence, whereas tree would not affect the rating since a tree is relatively common occurrence.

In another example, the characteristic may be the presence of multiple subjects within media file 500. The evaluation of the objective criteria may include a determination of a frequency that the subjects appear together in past media files. For example, user gallery 400 may include image files 402, 404, 406, 408, 414. Image file 402 may include subject A, image file 404 may include subject B, image file 406 may include subjects A and B, image file 408 may include subject C, and image file 414 may include subjects A, B, and C. Image file 414 may be evaluated to have a greater difficulty to reproduce since subjects A, B, and C do not appear together in other image files.

In another example, the characteristic may be a time that media file 500 was generated and its proximity in time to an event. For example, media file 500 created in close proximity to an event may be tied to that event and may be more difficult to reproduce. An event may be determined based on user data, such as social media information, a user calendar, a user's email, or other user internet history. For example, if a user has a calendar entry for a wedding, media files generated during that time may be evaluated to have a higher difficulty to reproduce than media files generated at other times.

In another example, a characteristic may be the presence of previous media files related to the media file. For example, if image 402, image 404, and image 406, were similar to the media file, it may be an indication that the media file is relatively easier to reproduce. If, however, there are few or no previous media files similar to the media file, it may be an indication that the media file is difficult to reproduce. The similarity of previous media files may be determined using conventional techniques, such as comparing a rendered image to determine a similarity.

The systems described herein may perform step 304 in a variety of ways. In one example, computing device 202 may analyze media file to evaluate objective criterion to generate a rating of a difficulty to reproduce the media file. In another example, server 204 may analyze media to evaluate objective criterion to generate the rating of the difficulty to reproduce the media file. In another example, computing device 202 may send information, such as metadata 501 to server 204 to evaluate the objective criterion to determine the rating.

At step 306 one of more of the systems described herein may compare the difficulty rating of the media file to an existing difficulty rating for at least one previous media file. For example, backup policy module 108, as part of computing device 202 in FIG. 2, may compare the difficulty rating in step 304 to existing difficulty rating for at least one previous media file. For example, media files 402, 404, 406, 408, 410, 412, 414, and 416 may each have an existing difficulty rating. Backup policy module 108 may compare the difficulty rating produced in step 304 to each of the existing difficulty ratings.

The systems described herein may perform step 306 in a variety of ways. In one example, reproducibility determination module 106 of computing device 202 may evaluate the objective criteria for a plurality of existing media files and store the results in memory. The evaluation of the objective criteria for the plurality of existing media files may be performed prior to performance of step 306. In some examples, evaluation of the objective criteria for the plurality of media files may be performed external to the computing device and the computing device may store only the results of the evaluation. Backup policy module 108 may then use the results of step 304 to compare the difficulty of reproducing the media file to the previous media files.

At step 308 one or more of the systems described herein may adjust a backup policy for the media file based on the comparison of the difficulty rating. For example, backup policy module 108, as part of computing device 202 in FIG. 2, may adjust the backup policy of the media file based on its difficulty rating compared to the existing difficulty ratings. If the file is more difficult to reproduce, it may be given a higher priority for backup. Or, if the file is relatively easy to reproduce, it may be given a low priority for backup.

The systems described herein may perform step 308 in a variety of ways. In one example, backup policy module 108 may assign a higher backup priority to the media file if the comparison indicates that it has a relatively higher difficulty score than the previous media files. In another example, backup policy module may lower a backup priority of the media file if the comparison indicates the media file has a relatively lower difficulty score than the previous media files.

As explained above in connection with example method 300 in FIG. 3, the described systems and method may prioritize backups based on the difficulty to reproduce the media files, which may result in a more efficient backup policy. For example, files which are evaluated to have a greater difficulty in reproducing may be prioritized over media files having a lower difficulty in reproducing. This prioritization may result in a more efficient backup policy that may not back up unnecessary data.

Once the media files are scored, computing device 202 may back up files according to the media file policies. For example, backup module 110 may back up higher scoring files ahead of lower scoring files, higher scoring files may be backed up more often than lower scoring media files, lower scoring files may be flagged for deletion when the backup is full, and/or only higher scoring files may be backed up over a mobile data connection.

Figure 6:
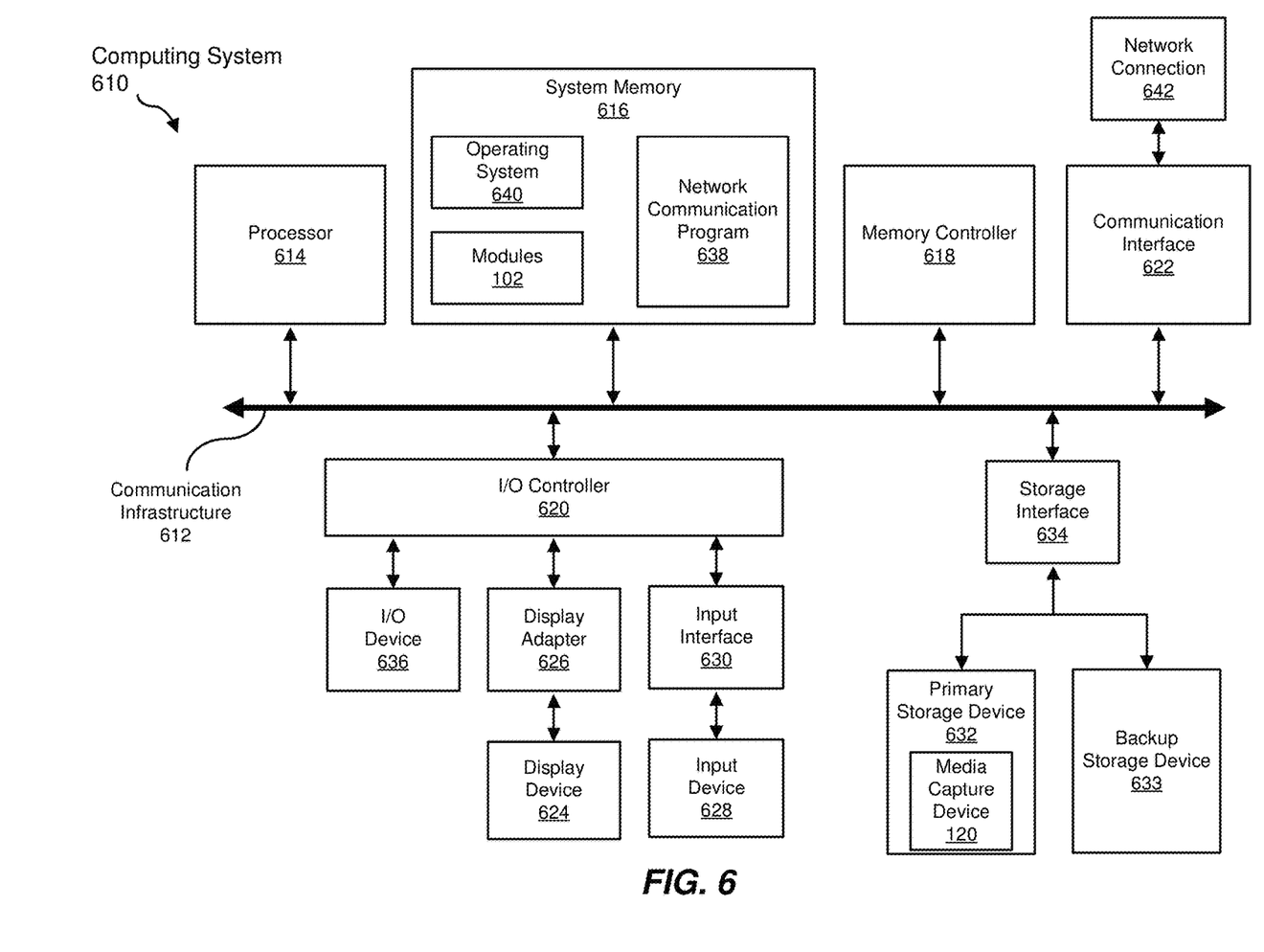
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, media capture device 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
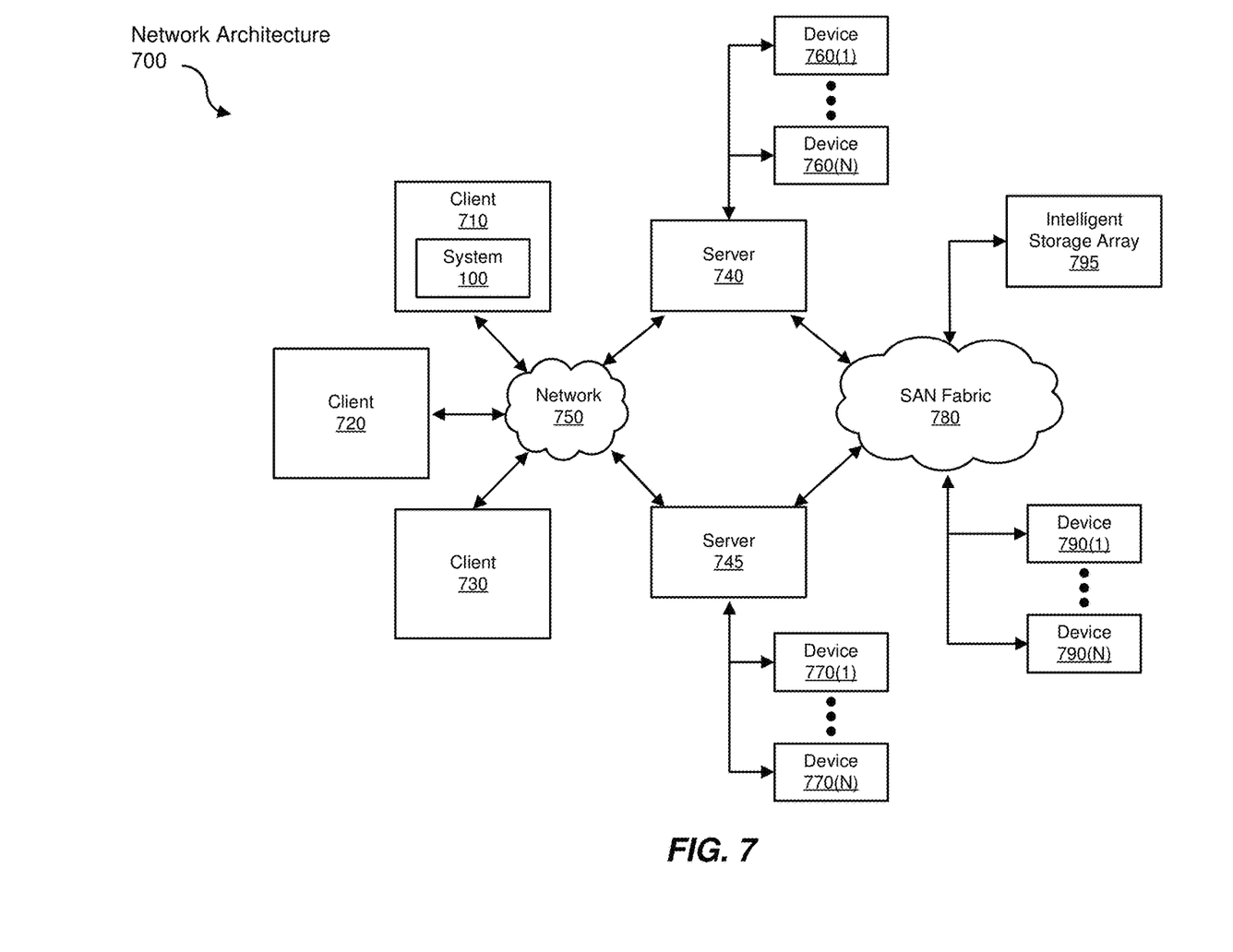
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for dynamically adjusting a backup policy.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a media file, generate a difficulty rating from the media file, compare the difficulty rating to an existing difficulty rating, adjust a backup policy of the media file based on the comparison, and backup the media file based on the new backup policy. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for dynamically adjusting a backup policy, the method being performed by a computing device comprising at least one processor, the method comprising:
    accessing a media file captured by a media capture device of a user;
    evaluating at least one objective criterion of a difficulty to reproduce the media file to generate a difficulty rating by evaluating a distance between a user's primary location and a location at which the media file was captured by the media capture device of the user, wherein the difficulty rating increases as a function of an increase of the distance;
    comparing the difficulty rating of the media file to an existing difficulty rating for at least one previous media file; and
    adjusting a backup policy for the media file based on the comparison of the difficulty rating.

2. The computer-implemented method of claim 1, wherein the media file is at least one of a digital image or a digital video.

3. The computer-implemented method of claim 1, wherein evaluating an objective criterion comprises a comparing a distance between a user's primary location and a location at which the media file was produced.

4. The computer-implemented method of claim 3, further comprising determining the location at which the media file was produced, wherein determining the location comprises at least one of accessing metadata in the media file, optical recognition of landmarks in the media file, optical recognition of landmarks in at least one previous media file, optical character recognition of text in the media file, or optical character recognition of text in at least one previous media file.

5. The computer-implemented method of claim 1, wherein evaluating an objective criterion comprises identifying subjects in the media file.

6. The computer-implemented method of claim 5, wherein evaluating an objective criterion further comprises determining a frequency that the subjects appear together in the at least one previous media file.

7. The computer-implemented method of claim 5, wherein evaluating an objective criterion further comprises determining a frequency that at least one of the subjects appears in the at least one previous media file.

8. The computer-implemented method of claim 1, wherein determining an objective criterion comprises determining an event occurring in the media file.

9. The computer-implemented method of claim 8, wherein determining an event comprises accessing user data.

10. The computer implemented method of claim 9, wherein user data comprises at least one of social media information, a user calendar, user email, user messages, or user internet history.

11. The computer implemented method of claim 1, wherein evaluating an objective criterion comprises determining a quantity of existing media files similar to the media file.

12. The computer implemented method of claim 11, wherein evaluating an objective criterion comprises comparing a quality of the media file to a quality of each of the existing media files similar to the media file.

13. A system for dynamically adjusting a backup policy, the system comprising:
- at least one physical processor;
- physical memory comprising computer-executable instructions that, when executed by the at least one physical processor, cause the at least one physical processor to:
- access a media file captured by a media capture device of a user;
- evaluate at least one objective criterion of a difficulty to reproduce the media file to produce a difficulty rating by evaluating a distance between a user's primary location and a location at which the media file was captured by the media capture device of the user, wherein the difficulty rating increases as a function of an increase of the distance;
- compare the difficulty rating of the media file to a difficulty rating for at least one previous media file; and
- adjust a backup policy for the media file based on the comparison of the difficulty rating for the media file and the difficulty rating for at least one previous media file.

14. The system of claim 13, wherein evaluating an objective criterion comprises comparing a distance between a user's primary location and a location at which the media file was produced.

15. The system of claim 13, wherein evaluating an objective criterion comprises at least one of identifying subjects in the media file, determining a frequency that the subjects appear together in the at least one previous media file, determining a frequency that at least one of subjects appears in the at least one previous media file, determining an event occurring in the media file, determining a quantity of existing media files similar to the media file, or comparing a quality of the media file to a quality of each of the existing media files similar to the media file.

16. The system of claim 15, wherein determining an event comprises accessing user data, wherein the user data comprises at least one of social media information, a user calendar, user email, user messages, or user internet history.

17. A non-transitory computer-readable medium comprising one or more computer-executable instructions that, when executed by at least one processor of a computing device, cause the computing device to:
- access a media file captured by a media capture device of a user;
- evaluate at least one objective criterion of a difficulty to reproduce the media file to produce a difficulty rating by evaluating a distance between a user's primary location and a location at which the media file was captured by the media capture device of the user, wherein the difficulty rating increases as a function of an increase of the distance;
- compare the difficulty rating of the media file to an existing difficulty rating for at least one previous media file; and
- adjust a backup policy for the media file based on the comparison of the difficulty rating for the media file and the existing difficulty rating for the at least one previous media file.

18. The non-transitory computer-readable medium of claim 17, wherein
- evaluating an objective criterion comprises comparing a distance between a user's primary location and a location at which the media file was produced.

19. The non-transitory computer-readable medium of claim 17, wherein determining an objective criterion comprises at least one of identifying subjects in the media file, determining a frequency that the subjects appear together in the at least one previous media file, determining a frequency that at least one of subjects appears in the at least one previous media file, determining an event occurring in the media file, determining a quantity of existing media files similar to the media file, or comparing a quality of the media file to a quality of each of the existing media files similar to the media file.

20. The non-transitory computer-readable medium of claim 19, wherein determining an event comprises accessing user data, wherein the user data comprises at least one of social media information, a user calendar, user email, user messages, or user internet history.

* * * * *